United States Patent [19]

Wallsten

[11] 3,960,386

[45] June 1, 1976

[54] MEANS FOR EXPANDABLE OBJECTS, PREFERABLY SHOCK-ABSORBING PROTECTIVE MEANS FOR PASSENGERS IN VEHICLES

[75] Inventor: Hans Ivar Wallsten, Saffle, Sweden

[73] Assignee: AB Inventing, Saffle, Sweden

[22] Filed: July 20, 1973

[21] Appl. No.: 381,145

[30] Foreign Application Priority Data
Feb. 12, 1973 Sweden .............................. 7301928

[52] U.S. Cl. ..................................... 280/731; 52/2
[51] Int. Cl.² ........................................ B60R 21/08
[58] Field of Search .......... 280/150 AB; 244/138 R, 244/DIG. 2, 146; 116/DIG. 9; 52/2; 135/20 B

[56] References Cited
UNITED STATES PATENTS

| | | | |
|---|---|---|---|
| 1,964,818 | 7/1934 | Hood | 52/2 |
| 2,297,150 | 9/1942 | Hunter | 52/2 |
| 2,771,899 | 11/1956 | Swallert | 52/2 X |
| 3,279,419 | 10/1966 | Demarco | 116/DIG. 9 |
| 3,675,942 | 7/1972 | Huber | 280/150 AB |
| 3,742,658 | 7/1973 | Meyer | 52/2 |
| 3,762,741 | 10/1973 | Fleck et al. | 280/150 AB |
| 3,784,225 | 1/1974 | Fleck et al. | 280/150 AB |

FOREIGN PATENTS OR APPLICATIONS

| | | | |
|---|---|---|---|
| 358,094 | 10/1931 | United Kingdom | 52/2 |

*Primary Examiner*—Stanley H. Tollberg
*Assistant Examiner*—Frederick R. Handren
*Attorney, Agent, or Firm*—Ostrolenk, Faber, Gerb & Soffen

[57] ABSTRACT

A safety bag formed of a flexible foldable material occupying a small volume when collapsed and expandable to form a hollow enclosure substantially completely surrounding an interior space by means of interconnected channels arranged along the surface of the shell and adapted to receive and retain a pressurized gas. The interior is filled with ambient air during the expansion process and its volume is preferably at least five times and, in some cases, of the order of forty times greater than the total interior volume of the inflatable channels. Means, including the shell itself, serve to limit the extent of inflation of the channels.

8 Claims, 18 Drawing Figures

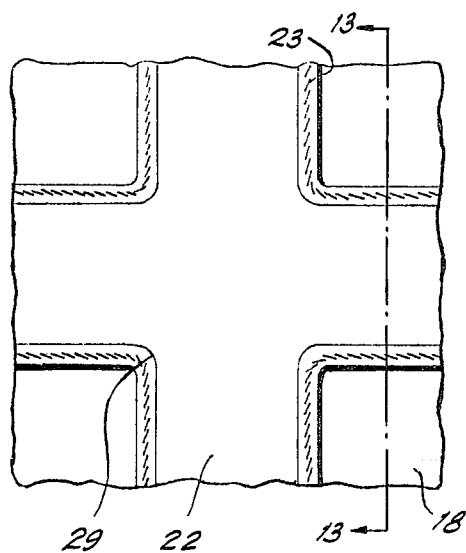
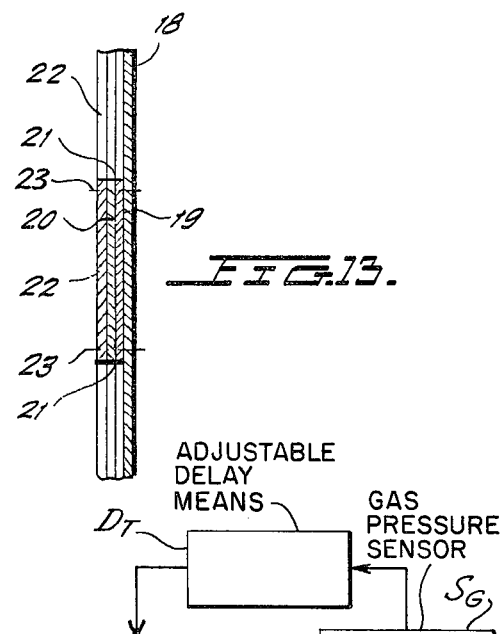
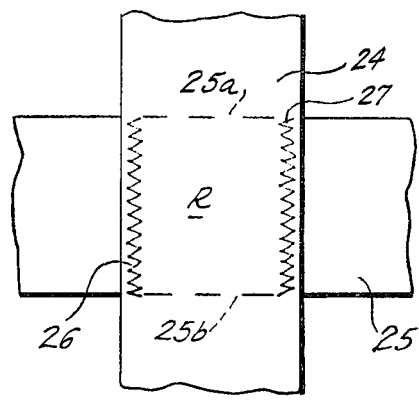
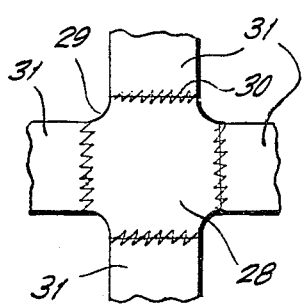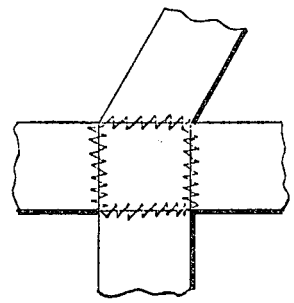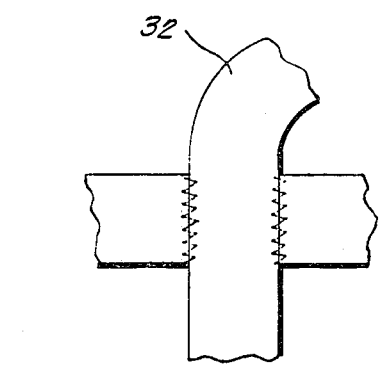

MEANS FOR EXPANDABLE OBJECTS, PREFERABLY SHOCK-ABSORBING PROTECTIVE MEANS FOR PASSENGERS IN VEHICLES

The present invention relates to expandable means, preferably shock-absorbing protective means for passengers in vehicles, said means comprising an enclosure which can be expanded from a folded state and having a similarly folded and expandable system of channels extending along the walls of the enclosure, in which the enclosure can be made to expand by supplying compressed gas to said channels so that the surrounding air at least partially fills the interior volume of the expanded enclosure.

BACKGROUND OF THE INVENTION

It is already known that by rapidly supplying gas to a bag or balloon in the event of a collision, it is possible to inflate the bag to form an inflated buffer structure filled with gas which structure serves as shock-absorbing protection for a passenger in the vehicle. Since, particularly in the case of front-seat passengers, bags are required which when inflated are extremely large and the time for inflation must be extremely short, usually of the order of a few hundredths of a second, extremely high gas speeds are required to effect this inflation. This has in turn caused considerable problems such as the load noise occurring during rapid inflation. Furthermore, the overpressure occurring in a closed car when one or more of these protection means is rapidly inflated may damage the hearing organs of the passengers and cause permanent injury.

Arrangements exist which are aimed at avoiding the drawbacks involved with such conventional protective devices. For instance, it has been suggested that the protective arrangements be inflated by supplying compressed gas to a system of channels having a limited volume, said channels extending along the walls of the protective bag so that the folded bag can be made to expand rapidly while supplying rather limited quantities of compressed gas. At the same time, the ambient air in the inside of the car serves to fill the inside of the expanding bag, thus avoiding the drawbacks of the high gas speeds as well as overpressure inside the car.

DESCRIPTION OF THE INVENTION AND OBJECTS

If a protective bag provided with channels is to be effective in the event of a collision, however, certain important conditions must be fulfilled. First of all, the protective bag, as well as the channels, when in the unexpanded state, must be easily folded and designed to occupy a limited amount of space. During rapid inflation the gas supplied must be able to fill the channels without too much obstruction and the channels must be able to withstand considerable pressure. Furthermore, they must be designed so that a certain variation in the quantity of gas supplied is permissible without the expansion being noticeably affected. Thus, for example, variation in the quantity of gas supplied, caused by different ambient temperature conditions, should not noticeably affect the efficiency of the protection means. Furthermore, a lower pressure than that intended cannot be permitted in the channels towards the completion of the expansion operation due to uncontrolled leakage from the channels, for example.

The present invention permits mass production of a channel system suitable for said protection means, in which the above mentioned conditions are fulfilled. It has also been found that it is possible to mass produce protection means extremely inexpensively and without undue wastage of material through the teachings of the present invention, and that these means always expand rapidly and reliably in spite of changes, for example, in the temperature of the compressed gas source and/or the car interior. This is achieved according to the invention by means of the features defined in the accompanying claims.

It is therefore an object of the present invention to provide a safety bag structure which inflates by means of channels whose interior volume is 15 % or less then the bag volume.

Another object is to provide novel interconnected channels for such safety bags which are easily inflatable, are gastight and are inflatable only up to predetermined limit.

BRIEF DESCRIPTION OF THE FIGURES

The above, as well as other objects of the invention will be further understood from the following description making reference to some embodiments shown in the accompanying drawings, wherein:

FIG. 12 is a plan view showing a horizontal view of a channel intersection;

FIG. 13 is a sectional view of FIG. 12 taken along line 13-13 in FIG. 12;

FIGS. 14 – 17 are plan views of various alternative embodiments of the channel intersections; and FIG. 18 is a perspective view showing an enlarged detail of the channel system proposed according to the invention.

DETAILED DESCRIPTION OF THE FIGURES

Figure 1:
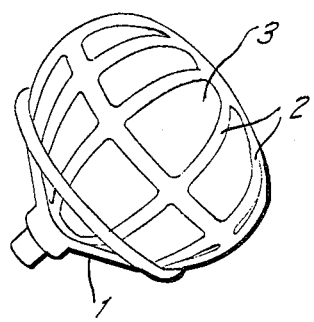
FIG. 1 shows a perspective view of a collision protection means according to the invention, in the expanded state.

FIG. 1 shows a protection means manufactured according to the invention and intended to protect the driver of a vehicle in a frontal collision, for example. The protection means is shown in expanded state. 1 designates a typical automobile steering wheel, at the centre of which the bag-like protection means was originally stored in the folded state. At the moment of a collision, a sensor can in known manner cause compressed gas in a container to expand rapidly into the branch network of channels 2 arranged primarily in the walls 3 of the folded bag. The bag is thus brought to expand into the predetermined shape illustrated in FIG. 1, the channels 2 effecting expansion of the bag by being folded out and stiffened as they fill with gas. Although the bag is shown as being mounted upon the steering wheel, it should be understood that the present invention may be mounted in other and different positions depending upon the particular application.

If a safety device of the type shown is to be of any practical value, it must be possible to fold it so that it takes up very little space and the expansion must be able to take place in several directions without too much resistance when the bag folds out. This means that even in the unexpanded state, the channels 2 must occupy very little space and they must be flexible so that during the expansion process they are quickly filled with compressed gas without offering too much resistance themselves. Furthermore, it must be possible to easily and flexibly attach them along the greater part of their length to the corresponding wall section so that the wall 3 is pulled toward the expanded state along with the expansion of the channels 2.

It has also been found advisable for the channels 2 to be at least partially in communication with one another. It has been found, namely, that if one of the channels 2 is folded unsuitably this may obstruct the compresed gas during the expansion process. However, if this channel 2 is also in communication with the same source of compressed gas at its other end, i.e. if said channel constitutes a branch in the channel network, this risk is eliminated since the compressed gas can fill the channel system in spite of the obstruction, which can be opened from the other side.

It has also been found that said channels 2 and the channel network must be able to withstand relatively high pressure. Thus, by a suitable choice of the quantity of compressed gas in relation to the channel volume in expanded state, the time needed to expand the bag can be considerably reduced. This is essential in order to provide effective protection even at high vehicle travelling speeds. It has thus been found in one case that if the highest pressure in the channels during expansion of the bag has been increased by an alteration of pressure and volume in the compressed gas source from 0.4 kgf/cm$^2$ atm. overpressure to 0.7 kgf/cm$^2$ atm. overpressure, the elapsed time for expansion would have decreased from 0.020 sec. to 0.008 sec. This might mean that the protection means which, in the one case, would be effective in vehicles travelling at speeds of up to 30 miles an hour, might instead be effective at up to 50 miles an hour.

In view of the great demands which must be met concerning the reliability of safety devices, it can be ascertained that the channel system and its connections should be able to withstand pressures which are many times greater than those pressures stated hereinabove. It has also been found possible in certain embodiments according to the invention to manufacture gas-tight channel systems which will withstand pressures of 6 atm. overpressure and above.

Another problem must also be dealt with in devices of the type mentioned. Since it must be possible for the safety devices to be mass produced inexpensively, it must also be possible for the channels forming a part of the safety device to be mass produced. Thus, individual variations during the manufacture in the form of gas-leakage in the channels, for example, cannot be permitted. The compressed gas source, as well as the volume and pressure of the compressed gas must also be assumed to be standardized and individual variations due to possible leakage in the channel system would lead to considerable practical difficulties. The channel system must therefore be free from leakage at least up to a certain predetermined operating pressure. However, variations in the quantity of expanded gas can hardly be avoided. This is because a completely different temperature may prevail at the moment of a collision from that when the safety device was installed. Thus, due to variations in temperature, the pressure may be lower than that intended. In view of this, therefore, the quantity of compressed gas and the pressure in the compressed container should at the start be such that, even when expansion takes place in extremely cold surroundings, for example, the ideal pressure can be achieved in the channels. On the other hand, the channel system should be arranged so that if it is expanded in warm surroundings a corresponding pressure increase is completely or partially prevented. Alternatively, the channels should be designed to withstand a higher pressure.

To summarize, the following requirements may be stated for a channel system intended for safety devices of the type in question:

1. It must be possible to manufacture the channel system in many different configurations in the form of straight or curved channels.
2. When unexpanded, the channels shall occupy very little space and should be flexible.
3. It must be possible to manufacture the channel system in a branch-like network in which the channels are in communication with each other.
4. The channels must be capable of withstanding a sudden pressure increase to a relatively high pressure without being damaged.
5. The channel system must not leak when supplied with compressed gas, or at least the leakage must be controlled.
6. The channels should be flexibly attached to the wall of the bag.
7. It must be possible to mass produce the channel system together with the rest of the bag inexpensively and with a minimum of waste material.
8. The channel system must be able to withstand being stored for several years in folded state.

The invention in question relates to a channel system which fulfills the requirements listed above in its various embodiments and has thus been found to effectively contribute to a rapid and safe expansion of protective bags of the type mentioned earlier.

According to the invention, each channel section is formed of two different materials in combination, arranged so that the combination comprises an inner, gastight, thin, flexible and relatively elastic material and an outer, strong, flexible material, which in relation to said inner material, is less elastic.

Figure 2:
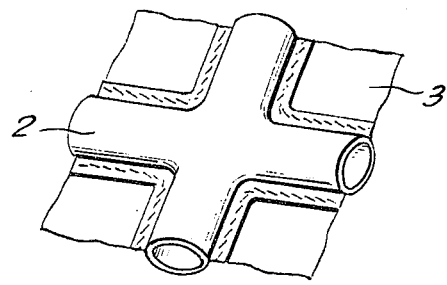
FIG. 2 is a perspective view which shows a detailed enlargement of the channel system forming a part of such a collision protection means.

FIG. 2 shows a part of the channel system in the shell according to FIG. 1.

Figure 3:
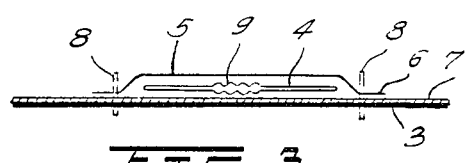
FIG. 3 is an elevational view which shows a cross-section through a channel manufactured according to the invention in the unexpanded state, according to a first embodiment.
Figure 4:
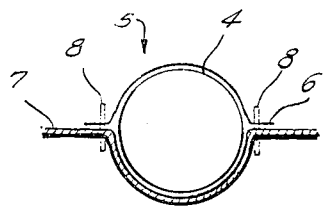
FIG. 4 is a sectional view showing the channel according to FIG. 3 in the expanded state.
Figure 5:
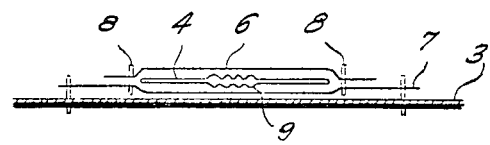
FIG. 5 shows a cross-section through an unexpanded channel according to another embodiment.
Figure 6:
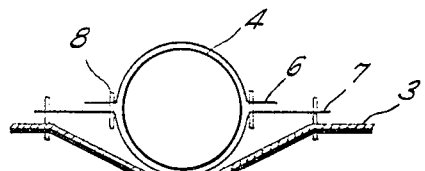
FIG. 6 is a sectional view showing the channel according to FIG. 5 in the expanded state.

FIG. 3 shows a cross section of an embodiment of a channel 2 constructed in accordance with the invention, and FIG. 4 shows the same channel in expanded state. An inner space is limited by a tube-like inner wall 4, surrounded on all sides by an outer wall of strong, flexible material, forming an outer shell 5 which, in the embodiment shown, comprises an upper part 6 and a lower part 7 having relatively low extensibility. The lower part 7 thus forms a part of the bag wall 3. 8 schematically denotes means joining the upper part 6 to the lower part 7 and these means must also have relatively low extensibility. In the embodiment shown in FIGS. 3 and 4 the inner wall 4 is not joined to the upper and lower parts 6, 7 of the outer wall. This is an advantage from the point of view of combining different materials. This possibility is increased if the inner and outer walls are movable in relation to each other although the inner and outer walls may be joined at least pointwise or in zones.

Comprehensive experiments have shown that it is most suitable if the upper and lower parts 6, 7, forming the outer walls consist of a strong material, for example a textile fabric such as nylon, Orlon or glass fibre, or of some other synthetic or natural fibre material, in which case the bag wall can also be made of this material. By suitable choice of both material and weave, a limp and yet strong and flexible outer wall with relatively low extensibility can be obtained. In such a case, the inner wall may suitably consist of a thin preferably limp plastic material having good flexibility and elasticity greater than that of the outer wall. By good elasticity is meant that the material forming the inner wall can easily expand to the intended form and shape due to the forces operating during expansion, the inner wall having folds because the material has, for example, been folded or stretched in advance and/or because its strength properties easily permit extension due to plastic and/or elastic deformation. The folds 9 in FIGS. 3, 5, 7 and 9 indicate symbolically that the material has been folded and/or has good stretchability and can easily be expanded by means of extension in accordance with one of the methods mentioned. The two parts 6, 7 forming the outer wall can in this case suitably be joined by means of a seam of nylon or terylene thread, for example. Seams are suitable for various reasons, among which are that they give satisfactory strength and flexibility as well as providing a quick, simple, inexpensive method of joining the two parts. In certain embodiments of the channels, it has been found suitable for the thin material of the inner wall to have an extensibility of at least 20 % in mutually perpendicular directions.

FIG. 4 illustrates a cross-section of the channel according to FIG. 3 when in the inflated state. When supplied rapidly with gas the thin, gastight inner wall 4 expands to form a round tube. The material is not in itself dimensioned for the relatively high gas pressure prevailing. Since the parts 6, 7 forming the outer wall, and the seams 8 are strong enough to withstand the gas pressure and have relatively little elasticity, therefore, the material combination which is extremely flexible and thin in the unexpanded state, can without leakage withstand relatively high gas pressures during and after the expansion, the outer wall and inner wall cooperatively forming a relatively stiff volume-limiting cylinder having a substantially circular cross-section. By suitable choice of plastic material, therefore, an extremely flexible, limp and thin channel is obtained in the folded state. It has been found, for example, that the inner wall may suitably consist of low density polyethene in thicknesses of max. 500 $\mu$, and preferably between 20 $\mu$ – 300 $\mu$. Such material in itself permits relatively great stretching during inflation, but it is also possible to fold the material so that the least possible resistance is met during the rapid expansion.

As mentioned, the lower part 7 may form a part of the bag wall. In the embodiment according to FIG. 5, the lower part 7 consists of a separate structure which is attached to the bag wall 3 in any suitable manner. In another embodiment the outer wall consists of a single part in the form of a sheet of material which is folded in longitudinal direction and the adjacent free edges joined together.

Figure 7:
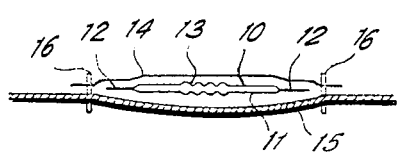
FIG. 7 is a sectional view showing a cross-section through an unexpanded channel according to yet another embodiment.
Figure 8:
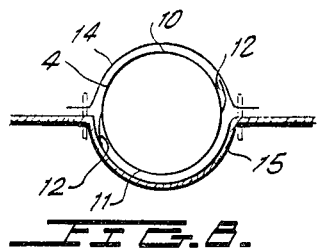
FIG. 8 is a sectional view showing the channel according to FIG. 7 in expanded state.

In the embodiment according to FIG. 7, the inner wall consists of an upper part 10 and a lower part 11 which are joined and sealed in a gastight manner along the edges in zones 12, for example by heating. The relatively high extensibility is illustrated symbolically by folds 13 and the outer wall consist of parts 14 and 15 which are attached at 16. FIG. 8 shows this channel in inflated state showing how the sealed edges 12, 12 are pressed against the parts 14 and 15 of the outer wall. In actuality the parts 10 and 11 will engage parts 14 and 15 but have been shown in spaced fashion to illustrate the arrangement of sealed edges 12, 12. It has been found that if the inner wall can easily rapidly be stretched, the strain on the sealed edges will be so slight that there is no risk of the seal rupturing.

In another embodiment, the inner wall consist of a single part in the form of a strip of material, folded longitudinally, the adjacent edges being sealed together.

Figure 9:
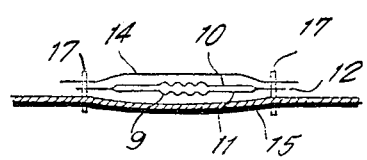
FIG. 9 shows a cross-section through an unexpanded channel according to yet another embodiment.
Figure 11:
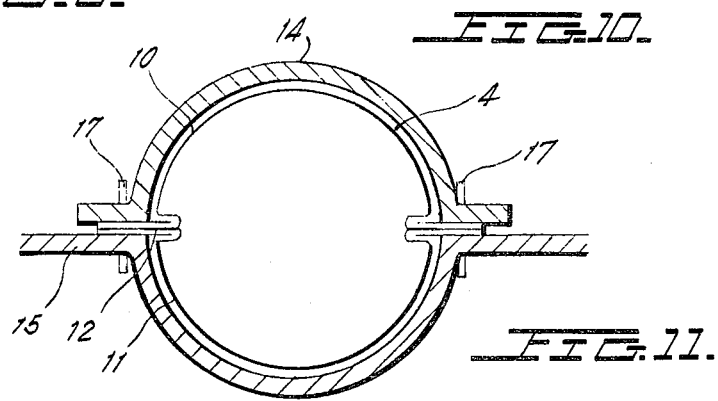

FIG. 9 shows yet another embodiment in which the parts 14 and 15 of the outer wall have been joined, for example by seams 17, 17 which also pass through the joined edges of the inner wall either inside or outside the zones 12. FIG. 11 substantially illustrates on an enlarged scale how the sealed edges will react when they are forced by the gas pressure against the outer wall at the points where the upper and lower parts have been joined together by a through-seam 17, for example.

Figure 10:
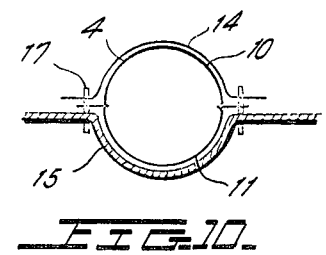
FIGS. 10 and 11 are sectional views showing the channel according to FIG. 9 in expanded state.

The embodiments according to FIGS. 7 – 11 have certain advantages over those described earlier. Since the inner wall consists of an upper part 10 and a lower part 11 which, because they are sealed together, form an inner sleeve when inflated, a system of connecting channels can easily be produced. This can be seen more clearly in FIG. 12 where the lower part of the outer wall is designated 18 and preferably constitutes part of the bag. 19 and 20 designate the parts intended to form the inner wall, which have been joined at 21. 22 designates the upper part of the outer wall, 23 designates seams for joining the various parts, this being done in FIGS. 12 and 13 in the same way as shown in FIGS. 9 – 11. As can be seen from FIGS. 12 and 13, a connection between two intersecting channels 2 can easily be effected since in this case the parts 19, 20 and 22 constitute cruciform-shaped pieces placed over the bottom piece 18.

Another advantage with the embodiments according to FIGS. 7 – 13 is that since the inner wall consists of two parts 10 and 11 joined along their edges in zones in the manner indicated in these figures, the channel in unexpanded state has a total thickness which is only as great as the total material thickness even along the joined edges.

FIG. 14 shows how the elements forming the channel system according to FIGS. 12 and 13 can be easily manufactured with little waste. Thus, the thin inner parts 19 and 20 can each be made of a pair of strips 24, 25 of thermoplastic material, for example, which are heat-sealed in a gastight manner along the stretches 26 and 27 or along the stretches 26 and 27 and the marginal regions of dotted lines 25a and 25b, or over the entire cross-hatched region R. The inner parts thus formed may then be joined to one another in the same fashion as the cruciform-shaped members 19 and 20 of FIGS. 12 and 13. Of course, the part 22 can also be manufactured in a corresponding manner, for example by joining elongated woven nylon fabric strips with seams.

FIGS. 15 – 17 show still more embodiments of the channel parts. FIG. 15 shows an intersection comprising a piece 28 which may have radii 29, the piece 28 being joined along the lines 30 to the strips 31. FIGS. 16 and 17 show other alternative embodiments. In all cases the joints or seams are indicated schematically by zig-zag lines. The embodiment shown in FIG. 17 has proved suitable to provide curved connections 32 to the compressed gas system, for example.

It has also proved possible to manufacture channels according to the invention, which can be made to assume other curved shapes. FIG. 18 shows an embodiment where the expanded channels 2 have been made to curve in different directions, but not only in one plane as in the embodiment according to FIG. 17. This can be achieved by shrinking and/or extending the parts 14 and/or 15 (see FIGS. 7 – 11) of the outer wall at the point where a bend or curvilinear shape is desired. If the outer walls consist of material, for example, a so-called gathering thread 33 (see FIG. 18) can be inserted at the inside curve where a bend is intended. When the channel system has been attached to the bag, therefore, the gathering threads can be pulled to draw the material together along one side of the channel outer wall so that a curve is obtained when the channel expands. The same effect can be achieved by the insertion of shrinkage threads which have the characteristic of shrinking when heated. The parts 14 and/or 15 may also be made of shrinkage fabric (see FIG. 9) so that the shrinkage can be effected by heating.

As mentioned previously, these protective bags can expand in an extremely short period of time, assuming that relatively high pressure can be built up instantaneously in the channel system. Since the channel system is leakage-free, the quantity of gas required in order to obtain a specific final pressure can easily be calculated. With this value as a starting point it is possible to calculate suitable volume ($v_1$) and pressure ($p_1$) of the compressed gas in its compressed state in the container prior to the expansion, in relation to the volume ($v_2$) and pressure ($p_2$) in the expanded channel system and the gas container and supply means. The product of $P_1$ and $v_1$ is in this case a constant ($p_1 v_1 =$ constant or $p_1 v_1 = P_2 v_2$). Experiments have shown that the choice of a combination of a high value for $p_1$ and a correspondingly lower value for $v_1$ results in quicker expansion times than combinations with a lower $p_1$ value and relatively high $v_1$ value. This is because the gas with higher pressure fills the channel system more quickly. Thus it has been found that if the total volume $v_2$ according to the above is 5 liters at a corresponding final expansion pressure of 0.8 kgf/cm$^2$ atm. overpressure, a protection bag can be expanded to a volume of about 200 liters. In order to avoid excessive gas speeds or container pressure, it is advisable for the channel volume (when fully expanded) to constitute a maximum of 15 % of the volume of the interior volume of the fully expanded shell. An extremely rapid expansion of the pressure bag is obtained if $p_1$ according to the above is about 15 kgf/cm$^2$, which corresponds to a ratio $p_1 : p_2$ of 20.

However, relatively high expansion pressure means that greater demands must be placed on the strength of the channel system as there is a risk that high pressures can be built up locally in the system.

It has been mentioned previously that differing temperatures may give rise to different pressures after the expansion. It has therefore been found advisable to fit a safety valve at a suitable point in the channel system, which will release gas at a certain overpressure. The expanded quantity of gas can then be over-dimensioned so that a release of gas always takes place when the pressure caused by the expansion has reached a certain value. Variations in the expansion rate, caused by differing temperatures, for exaple, can thus be eliminated.

It has been found that safety devices having leakage-free channel systems in accordance with the invention offer protection against a series of collisions — something which is extremely desirable from the traffic safety point of view. The reason is that the remaining pressure in the channels allows the protection means to expand again after it has been compressed during the first jolt of a collision.

However, in certain cases it is desirable for the protection means to remain expanded only briefly and then collapse. This is primarily in the case of safety devices for drivers where it is important that the driver does not lose control of the vehicle because, for instance, the protection bag blocks his vision. In such cases a safety valve in the form of a so-called bursting membrane 34 (see FIG. 18) is applied in the channel system. When the expansion pressure reaches a certain value and the desired expansion has been obtained, the membrane in the valve bursts so that the compressed gas is emptied out of the channels. By suitable arrangement, the compressed gas sensor $S_G$ can be made to actuate valves such as V, so that, after a time delay which can be set in means $D_T$, the shell is emptied of the air drawn in during the expansion.

a multitude of different embodiments are feasible within the scope of the invention, only a few of which have been described here. Some examples of suitable material and suitable methods will be mentioned in the following. It has, for instance, been found possible to manufacture protective bags having channel systems in an extremely inexpensive and rational manner so that in the folded state the bags take up very little space and so that they expand extremely quickly.

It has been found suitable to make the inner wall of a thin, stretchable plastic material which can be sealed. A suitable material is strips of LD low density polythene or polyvinylchloride (PVC). Particularly at the intersections (corresponding to 29 in FIGS. 12 and 13), the inner wall is subjected to considerable stress and material having considerable stretchability has therefore proved to be suitable, for example due to high plasticity and/or elasticity. It has thus been found that an extremely thin and flexible channel system in unexpanded state can be obtained by making the inner wall of strips of a film consisting of a polyolefine, for example polyethene, PVC or so-called plastic rubber (i.e. a copolymerisate of styrene-butadien or styrene-butadien-styrene) or a mixture of polythene and ethylene-vinylacetate (EVA) or polythene and plastic rubber. Suitable thicknesses are max. 500 $\mu$, preferably between 20 – 300 $\mu$.

In many cases it has been found extremely satisfactory if the material of the inner wall consists of polythene mixed with at least 10 % plastic rubber. This material has great extensibility and stores well. Due to the extreme extensibility the seam 17, for example, as shown in FIGS. 9 and 10, can be sewn relatively far outside the inner edge of the welding zone joining the two parts 10 and 11 of the inner material. This means that the parts 14 and 15 need not be sewn together so carefully, which is of course an advantage when dealing with products which must preferably be mass-produced. The parts 10 and 11 forming the inner wall which are joined by means of heat-sealing may suitably be expanded by supplying compressed gas when being assembled. In this way a controlled and permanent stretching of the inner wall is obtained.

The parts of the outer wall (corresponding to 22 in FIGS. 12, 13, for example) may, if they do not form a part of the bag, consist of a woven fabric of nylon having a surface weight of max. 800 g/m$^2$, and preferably between 30 – 200 g/m$^2$. The outer wall need not be airtight. This is of course an advantage, particularly if the outer wall is formed by the bag. It has been found that bag walls which are not airtight are preferable since airtight bag walls might result in such elasticity in the expanded bag that a body thrown against it might rebound, with the risk of further damage. For this reason, a wall material which will let through a certain amount of air is preferably selected and in this respect no attention need be paid to the design of the channel system. Of course, the bag walls may also be manufactured of material having several layers. To facilitate filling of the bag, one-way flap-type valves may be incorporated into the bag wall to let ambient air in during the expansion phase and to prevent the release of air from the inner space when the bag experiences an impact. Other valve types may be used if desired.

The parts 10 and 11 of thermoplastic material forming the inner wall may of course be joined in various ways, for example by heating or ultrasonic techniques and may be joined before being arranged between the parts 14, 15 of the outer wall to be combined to a unit. In certain cases it is advisable for the distance between the seam 17 (see FIGS. 9 – 11) and the inner edge of the zone 12 to be as little as possible so that less strain is placed on the extensibility of the walls. It has therefore been found advisable for the edge zones 12 to be joined after or at the same time as the seams to join the outer and inner walls. A simple welding tool for thermoplastic welding can be run along the seam, possibly being guided by the seam, so that the heat penetrates the outer wall material 14, 15. However, the thermoplastic welding may be performed in a separate step either before or after the parts of the outer wall have been joined by means of a seam.

As an alternative to the embodiments shown in FIGS. 1 - 18 it should be understood that the material forming the spherical bag such as element 3 in FIG. 1 for example, may form the entire exterior surface and the channels 2 may be positioned in the interior surface. From an assembly viewpoint the manufacturing steps may be performed as described herein and the bag assembly may then be turned inside out. It should also be understood that the bag may assume shapes other than spherical without departing from the teachings herein.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Expandable means adapted for use as shock-absorbing protective means and the like for passengers in vehicles, said means comprising: a normally folded compact enclosure adapted to be expanded to a predetermined three-dimensional configuration from its folded state and having a similarly folded and expandable system of branched gas receiving channels interconnected and communicating with each other and extending along the walls of the enclosure, in which the enclosure is expanded by supplying compressed gas to said channels so that the ambient air at least partially fills the hollow interior of the expanded enclosure, said channels comprising an inflatable inner space whose inflation is limited by a thin, flexible, elastic and substantially gastight inner wall, said inner wall comprising a pair of branched continuous flat strips of material arranged one upon the other and joined along their long sides, said inner wall being surrounded by a flexible outer wall arranged, when the inner space is inflated, to entirely surround the inner wall and limit its expansion, and which becomes relatively stiff and assumes a substantially circular cross section upon expansion, said outer wall being a material which is strong enough to withstand the pressure prevailing in the inner space; said outer wall comprising two strips of material arranged one upon the other and joined along their long sides, joining means between the strips of material being sufficiently strong to withstand the pressure prevailing in the inner space and thereby limit the expansion of the inner wall.

2. Expandable means adapted for use as a shock-absorbing protective means and the like for passengers in vehicles, said means comprising: a normally folded compact enclosure adapted to be expanded to a predetermined three-dimensional configuration from its folded state and having a similarly folded and expandable system of gas receiving channels extending along the walls of the enclosure, in which the enclosure is expanded by supplying compressed gas to said channels so that the ambient air at least partially fills the hollow interior of the expanded enclosure, said channels comprising an inflatable inner space whose inflation is limited by a thin, flexible, elastic and substantially gastight inner wall, said inner wall being surrounded by a flexible outer wall arranged, when the inner space is inflated, to entirely surround the inner wall and limit its expansion, and which becomes relatively stiff and assumes a substantially circular cross section upon expansion said outer wall being a material which is strong enough to withstand the pressure prevailing in the inner space; the inner wall comprises two strips of material placed one upon the other and joined by a seal formed along each of their opposed longitudinal edges; the strips of inner wall material having at least one gathered portion when in the unexpanded state.

3. Expandable means adapted for use as shock-absorbing protective means and the like for passengers in vehicles, said means comprising: a normally folded compact enclosure adapted to be expanded to a predetermined threedimensional configuration from its folded state and having a similarly folded and expandable system of gas receiving channels extending along the walls of the enclosure, in which the enclosure is expanded by supplying compressed gas to said channels so that the ambient air at least partially fills the hollow interior of the expanded enclosure, said channels comprising an inflatable inner space whose inflation is limited by a thin, flexible, elastic and substantially gastight inner wall, said inner wall being surrounded by a flexible outer wall arranged, when the inner space is inflated, to entirely surround the inner wall and limit its expansion, and which becomes relatively stiff and assumes a substantially circular cross section upon expansion, said outer wall being a material which is strong enough to withstand the pressure prevailing in the inner space; said gas retaining portions of at least certain of the channels communicating with each other at intersections or branchings, wherein the channel network with intersections and branchings has inner walls comprised of two branched materials arranged one upon the other, each being comprised of a single piece of material and joined along their long sides, and the outer walls consisting of two branched pieces arranged one upon the other and joined along their long sides.

4. Expandable means adapted for use as shock-absorbing protective means and the like for passengers in vehicles, said means comprising: a normally folded compact enclosure adapted to be expanded to a predetermined three-dimensional configuration from its folded state and having a similarly folded and expandable system of gas receiving channels extending along the walls of the enclosure, in which the enclosure is expanded by supplying compressed gas to said channels so that the ambient air at least partially fills the hollow interior of the expanded enclosure, said channels comprising an inflatable inner space whose inflation is limited by a thin, flexible, elastic and substantially gastight inner wall, said inner wall being surrounded by a flexible outer wall arranged, when the inner space is inflated, to entirely surround the inner wall and limit its expansion, and which becomes relatively stiff and assumes a substantially circular cross section upon expansion, said outer wall being a material which is strong enough to withstand the pressure prevailing in the inner space; said gas retaining portions of at least certain of the channels communicating with each other at intersections or branchings, each of the branchings of the inner wall being substantially produced from several strips which are joined to form one piece by means of thermoplastic welding, for example.

5. Expandable means adapted for use as shockabsorbing protective means and the like for passengers in vehicles, said means comprising: a normally folded compact enclosure adapted to be expanded to a predetermined threedimensional configuration from its folded state and having a similarly folded and expandable system of gas receiving channels extending along the walls of the enclosure, in which the enclosure is expanded by supplying compressed gas to said channels so that the ambient air at least partially fills the hollow interior of the expanded enclosure, said channels comprising an inflatable inner space whose inflation is limited by a thin, flexible, elastic and substantially gastight inner wall, said inner wall being surrounded by a flexible outer wall arranged, when the inner space is inflated, to entirely surround the inner wall and limit its expansion, and which becomes relatively stiff and assumes a substantially circular cross section upon expansion, said outer wall being a material which is strong enough to withstand the pressure prevailing in the inner space; said gas retaining portions of at least certain of the channels communicating with each other at intersections or branchings, each of the branchings of the outer wall being comprised of several strips which have been joined to form one piece by means of seams, for example.

6. Expandable means adapted for use as shock-absorbing protective means and the like for passengers in vehicles, said means comprising: a normally folded compact enclosure adapted to be expanded to a predetermined three dimensional configuration from its folded state and having a similarly folded and expandable system of gas receiving channels extending along the walls of the enclosure, in which the enclosure is expanded by supplying compressed gas to said channels so that the ambient air at least partially fills the hollow interior of the expanded enclosure, said channels comprising an inflatable inner space whose inflation is limited by a thin, flexible, elastic and substantially gastight inner wall, said inner wall being surrounded by a flexible outer wall arranged, when the inner space is inflated, to entirely surround the inner wall and limit its expansion, and which becomes relatively stiff and assumes a substantially circular cross section upon expansion, said outer wall being a material which is strong enough to withstand the pressure prevailing in the inner space; said channels being provided in their outer walls with gathering threads so that when the channels are supplied with compressed gas, they are caused to assume longitudinal curvilinear configurations.

7. Expandable means adapted for use as shock-absorbing protective means and the like for passengers in vehicles, said means comprising: a normally folded compact enclosure adapted to be expanded to a predetermined threedimensional configuration from its folded state and having a similarly folded and expandable system of gas receiving channels extending along the walls of the enclosure, in which the enclosure is expanded by supplying compressed gas to said channels so that the ambient air at least partially fills the hollow interior of the expanded enclosure, said channels comprising an inflatable inner space whose inflation is limited by a thin, flexible, elastic and substantially gastight inner wall, said inner wall being surrounded by a flexible outer wall arranged, when the inner space is inflated, to entirely surround the inner wall and limit its expansion, and which becomes relatively stiff and assumes a substantially circular cross section upon expansion, said outer wall being a material which is strong enough to withstand the pressure prevailing in the inner space; said channels being provided in their outer walls with heat shrinkable fabric so that when the channels are supplied with compressed gas, they are caused to assume longitudinal curvilinear configurations.

8. Expandable means adapted for use as shock-absorbing protective means and the like for passengers in vehicles, said means comprising: a normally folded compact enclosure adapted to be expanded to a predetermined three-dimensional configuration from its folded state and having a similarly folded and expandable system of gas receiving channels extending along the walls of the enclosure, in which the enclosure is expanded by supplying compressed gas to said channels so that the ambient air at least partially fills the hollow interior of the expanded enclosure, said channels comprising an inflatable inner space whose inflation is limited by a thin, flexible, elastic and substantially gastight inner wall, said inner wall being surrounded by a flexible outer wall arranged, when the inner space is inflated, to entirely surround the inner wall and limit its expansion, and which becomes relatively stiff and assumes a substantially circular cross section upon expansion, said outer wall being a material which is strong enough to withstand the pressure prevailing in the inner space; at least one bursting membrane arranged to cooperate with the channel network so that the membrane bursts at a predetermined pressure allowing the compressed gas to escape from the channel network; means for receiving the compressed gas escaping through the burst member; valve means coupled to the enclosure; said receiving means including means responsive to the received gas to open said valve means; and adjustable delay means coupled between said opening means and said valve means for opening the enclosure.

* * * * *